US012406666B2

(12) United States Patent
Carbune et al.

(10) Patent No.: US 12,406,666 B2
(45) Date of Patent: Sep. 2, 2025

(54) FACILITATING VIRTUAL OR PHYSICAL ASSISTANT INTERACTIONS WITH VIRTUAL OBJECTS IN A VIRTUAL ENVIRONMENT

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 238 days.

(21) Appl. No.: 18/075,214

(22) Filed: Dec. 5, 2022

(65) Prior Publication Data
US 2024/0185849 A1    Jun. 6, 2024

(51) Int. Cl.
*G10L 15/22* (2006.01)
*G06F 3/01* (2006.01)
*G06T 19/00* (2011.01)

(52) U.S. Cl.
CPC ............ *G10L 15/22* (2013.01); *G06F 3/011* (2013.01); *G06T 19/006* (2013.01); *G10L 2015/223* (2013.01)

(58) Field of Classification Search
CPC ..................................................... G10L 15/22
(Continued)

(56) References Cited

U.S. PATENT DOCUMENTS 11,587,559 B2 * 2/2023 Newendorp ............ G06F 13/14
2006/0106611 A1 * 5/2006 Krasikov ............... G09B 19/04
704/E17.002
(Continued)

FOREIGN PATENT DOCUMENTS

JP    2021073796 A  *  5/2021  ........... B64C 39/024
WO    2022182744 A1    9/2022

OTHER PUBLICATIONS

E. Farella, D. Brunelli, L. Benini, B. Ricco and M. E. Bonfigli, "Pervasive computing for interactive virtual heritage," in IEEE MultiMedia, vol. 12, No. 3, pp. 46-58, Jul.-Sep. 2005, doi: 10.1109/MMUL.2005.54. keywords: {Pervasive computing;Virtual reality; Virtual environment;Handheld computers; Per (Year: 2005).*
(Continued)

*Primary Examiner* — Bharatkumar S Shah
(74) *Attorney, Agent, or Firm* — Gray Ice Higdon (57) ABSTRACT

Implementations set forth herein relate to an automated assistant that can be accessible via a virtual environment for controlling features of the virtual environment and/or devices in a physical environment of the user. When the automated assistant is invoked, the automated assistant can materialize in the virtual environment according to any request that the automated assistant has been invoked to fulfill. For example, depending on the request from the user, the automated assistant can cause rendering of a virtual object for fulfilling the request and/or controlling an ongoing operation of the automated assistant. When the virtual object is rendered to control an operation of the automated assistant, or another application, the virtual object can include a virtual feature that the user can interact with to control the virtual environment and/or devices in a physical environment of the user.

19 Claims, 7 Drawing Sheets

(58) Field of Classification Search
USPC .......................................................... 704/275
See application file for complete search history.

(56) References Cited

U.S. PATENT DOCUMENTS

| | | | | |
|---|---|---|---|---|
| 2018/0307303 | A1* | 10/2018 | Powderly | G06F 3/017 |
| 2021/0065682 | A1* | 3/2021 | Li | H04N 7/157 |
| 2021/0216384 | A1* | 7/2021 | Vlasyuk | G06F 40/35 |
| 2023/0109787 | A1* | 4/2023 | O'Leary | G06V 40/28 |
| | | | | 348/14.09 |
| 2023/0359334 | A1* | 11/2023 | Chapman | G10L 15/22 |
| 2024/0069564 | A1* | 2/2024 | Yuki | G01C 21/3804 |
| 2024/0412460 | A1* | 12/2024 | Josephson | G06F 3/016 |

OTHER PUBLICATIONS

R. W. N. Pazzi, A. Boukerche and T. Huang, "Implementation, Measurement, and Analysis of an Image-Based Virtual Environment Streaming Protocol for Wireless Mobile Devices," in IEEE Transactions on Instrumentation and Measurement, vol. 57, No. 9, pp. 1894-1907, Sep. 2008, doi: 10.1109/TIM.2008.919901 (Year: 2008).*

European Patent Office; International Search Report and Written Opinion issued in Application No. PCT/US2022/052433; 19 pages; dated Sep. 18, 2023.

European Patent Office; Invitation to Pay Additional Fees issued in Application No. PCT/US2022/052433; 12 pages; dated Jul. 27, 2023.

\* cited by examiner

FACILITATING VIRTUAL OR PHYSICAL ASSISTANT INTERACTIONS WITH VIRTUAL OBJECTS IN A VIRTUAL ENVIRONMENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

When a user is accessing a virtual environment, such as one that is accessible via a virtual reality (VR) headset, the user may seek to control their automated assistant while still being engaged with the virtual environment. For example, a user that is sitting on their couch while wearing a VR headset may provide a spoken utterance to solicit their automated assistant through a nearby assistant-enabled device, such as a standalone smart speaker. However, any audible response from the standalone speaker may be interrupted by other audio emitted by the VR headset (e.g., from speech of another user in the virtual environment). Alternatively, if the automated assistant responds to the user on an assistant-enabled display device, the user may not be able to view the display device without removing their VR headset. In such instances, the user may be caused to repeat their spoken utterance without wearing the VR headset, or find a way to fulfill their request using a different application of the VR headset.

SUMMARY

Implementations set forth herein relate to an automated assistant that can manifest various objects in a virtual environment and/or relate to a user interfacing with the automated assistant by interacting with the virtual objects manifested by the automated assistant in the virtual environment. A virtual object can be rendered in the virtual environment in response to a user invoking the automated assistant to fulfill a particular request. When the virtual object has been rendered, the user can further control the automated assistant by interacting with the object in the virtual environment. The automated assistant can be deployed to a virtual environment and/or interact with the virtual environment using an application programming interface (API), which can interact with a database for storing data that can be utilized to render the virtual objects.

As an example, a user can be accessing a virtual environment via a computing device, such as a virtual reality headset, which can receive a variety of different inputs such as spoken inputs, touch inputs, gesture inputs, and/or any other inputs that can be provided to a computing device. When the user is in a room of their virtual environment, the user can provide a spoken utterance such as, "Assistant, set an alarm." In response to the spoken utterance, an automated assistant application can cause an automated assistant to be invoked and render a virtual alarm clock object, or other virtual hardware device, in the virtual room. For example, the automated assistant can interface with the virtual environment to cause the virtual environment to render the virtual alarm clock object in the virtual room. In some implementations, the virtual alarm clock object can be a virtual assistant object that is rendered on a surface (e.g., a table) of the virtual room that is within a virtual viewing window of the user when the user provided the spoken utterance.

In some implementations, the virtual assistant object can include feature(s) that can indicate operation(s) the automated assistant can perform when the user interacts with the virtual assistant object, or otherwise provides an input to the automated assistant. Alternatively, or additionally, the virtual assistant object can include feature(s) that can indicate "warm" words that the user can provide to control the automated assistant without providing an invocation phrase (e.g., "Assistant . . . "). For example, when the virtual alarm clock object is rendered on a table in the virtual environment, the virtual alarm clock object can include a graphic display with blinking placeholder values (e.g., "0:00") to invite the user to provide a value for the alarm. Acknowledging the graphical display, the user can provide a spoken utterance such as, "30 minutes from now," which can cause the automated assistant to set an alarm for 30 minutes from the time of receipt of the spoken utterance. The placeholder values can then be replaced by values for the alarm (e.g., "0:30"), which the user can view in the virtual environment. In some implementations, when the user has not provided another spoken utterance for indicating the values for the alarm, the automated assistant can render an audible output via the virtual alarm clock object in the virtual environment. For example, when the virtual alarm clock object is in right-most portion of a virtual viewing window of the user, audio output from the automated assistant such as, "At what time?" can be panned to a right-most audio speaker of the computing device relative to the user. The virtual assistant object can include other features such as a button that says "Cancel," for canceling the alarm, and another button that says "Snooze," for snoozing or delaying the alarm when the alarm is going off. The user can control these features of the virtual alarm clock object by interacting with the virtual alarm clock object in the virtual environment (e.g., using a hand of their avatar to tap a button), providing a spoken utterance to the automated assistant, and/or otherwise providing an input that can be received by the automated assistant application.

In some implementations, virtual assistant objects can be rendered based on characteristics of the virtual environment and/or the type of virtual reality device that the user is accessing. For example, the user can provide a spoken utterance such as, "Assistant, play my TV show" in furtherance of viewing a television series that the user has recently been watching. When the user is wearing a virtual reality headset, the automated assistant can determine whether a virtual room of the user is suitable for rendering a virtual television on a wall, and if not, instead render a virtual tablet computing device. When the user is wearing an augmented reality headset (e.g., computerized glasses), the automated assistant can determine whether to control a physical television in a physical environment of the user and/or render a virtual remote control for controlling the physical television. Alternatively, or additionally, when no physical television is determined to be controllable within the physical environment of the user, the automated assistant can determine whether the physical environment is suitable for augmenting a view of the physical environment to include a virtual television (or other augmented reality/virtual reality object) and a virtual remote control for controlling the virtual television. Thereafter, the user can interact with the virtual remote control via gestures or other inputs to control the physical television or virtual television (e.g., adjusting audio volume, speed of playback, or other parameter of an ongoing operation, etc.) while accessing the virtual environment (e.g., a fully virtual environment or augmented reality).

In some implementations, requests for information from the automated assistant can be rendered by the automated assistant in the virtual environment, rather than strictly being limited to an audible output and/or a two-dimensional physical display in a physical environment. For example, while accessing a virtual environment, the user can provide a spoken utterance to the automated assistant such as, "Assistant, show me how to make Chana Saag." In response, the automated assistant can identify a recipe and/or an instructional video on the internet and, based on information identified by the automated assistant, select virtual objects to render for the user. In some implementations, the selected virtual objects (e.g., ingredients, utensils, oven, etc.) can be rendered and animated to convey the information gathered from the recipes and instructional videos, with prior permission from any authors and/or owners of the information. For example, in response to receiving the spoken utterance, the automated assistant can cause a virtual demonstration to be rendered in the virtual environment, and features of the demonstration can indicate other operations the automated can perform. For instance, the virtual demonstration can be rendered in a virtual kitchen environment, and a virtual phone can be hanging on a wall with a visible "speed dial" button that reads "Call XYC Grocery to Order Delivery of Ingredients." The user can then activate the "speed dial" button by tapping the button in the virtual environment and/or speaking a warm word associated with the button "Call to Order the Ingredients" while gazing, in the virtual environment, at the virtual phone. As a result, a phone call can be placed to a physical grocery in the physical environment for ordering the ingredients for the recipe.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

FIG. 1A, FIG. 1B, FIG. 1C, and FIG. 1D illustrates a view 100, a view 120, a view 140, and a view 160 of a user 102 accessing a virtual environment that allows for assistant interactions via virtual objects in the virtual environment. The user 102 can access the virtual environment (illustrated in FIG. 1B and FIG. 1C) using a computing device 104, such as a VR headset, computerized glasses, and/or any other computing device that can provide access to a virtual environment. When the user 102 is wearing the computing device 104, the user 102 can be located in a physical environment 106, such as their living room, which can include other devices (e.g., a television 108, a standalone speaker device 110, and a display device 112) that can provide access to an automated assistant and be connected to the same wireless network as the computing device 104.

Figure 1A:
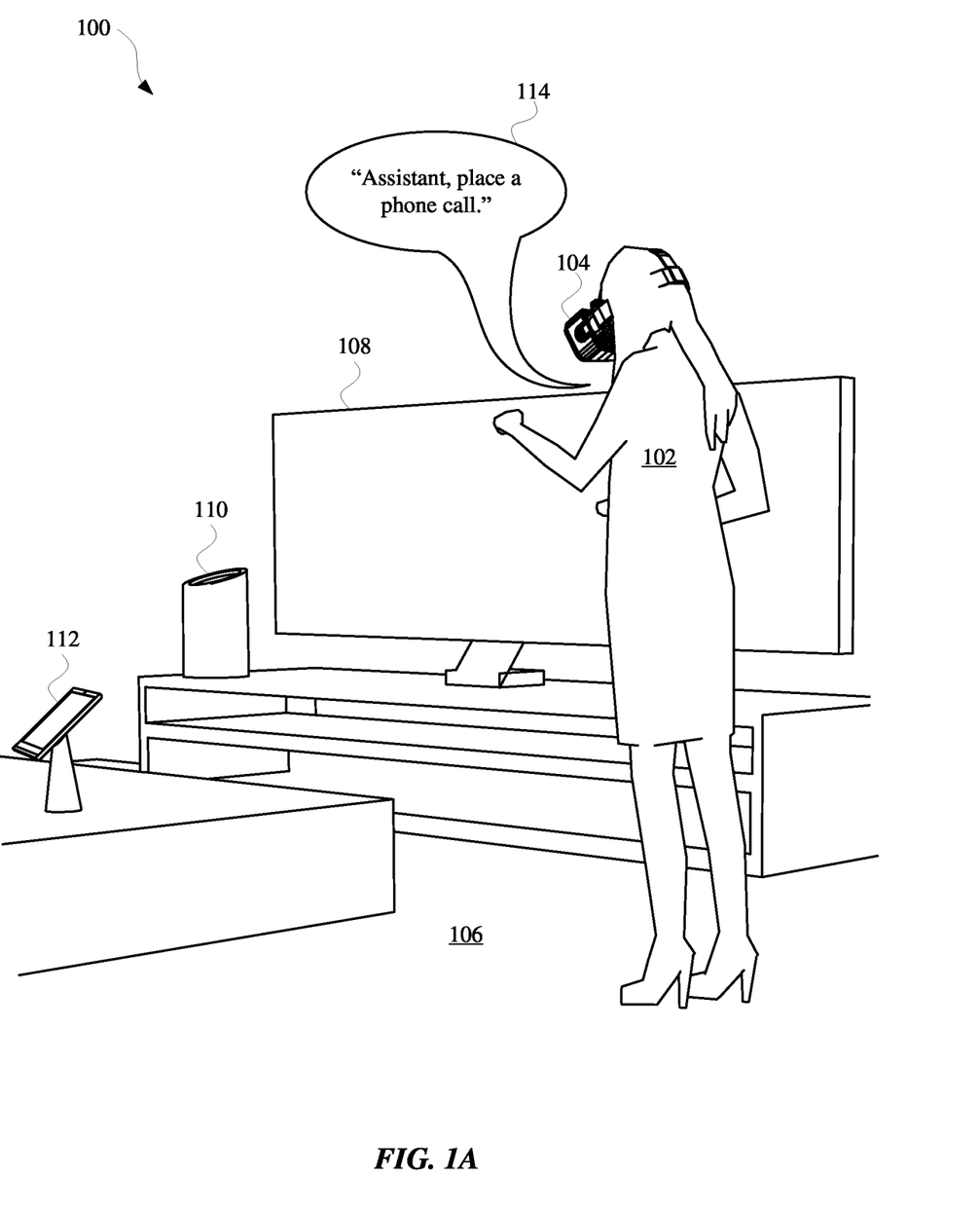
FIG. 1A, FIG. 1B, FIG. 1C, and FIG. 1D illustrate views of a user accessing a virtual environment that allows for assistant interactions via virtual objects in the virtual environment.

In some implementations, the user 102 can invoke the automated assistant while viewing the virtual environment via a display interface of the computing device 104. For example, the user 102 can provide a spoken utterance 114 such as, "Assistant, place a phone call." The spoken utterance 114 can be detected by one or more devices in the physical environment 106, such as the computing device 104 and/or the standalone speaker device 110. One or more device arbitration techniques can be utilized by the devices in the physical environment 106 to determine that the spoken utterance 114 is directed to the automated assistant and should be responded to at the computing device 104. However, in some instances, a device arbitration process may result in another device, separate from the computing device 104, responding to a spoken utterance when the user 102 is accessing the virtual environment.

Figure 1B:
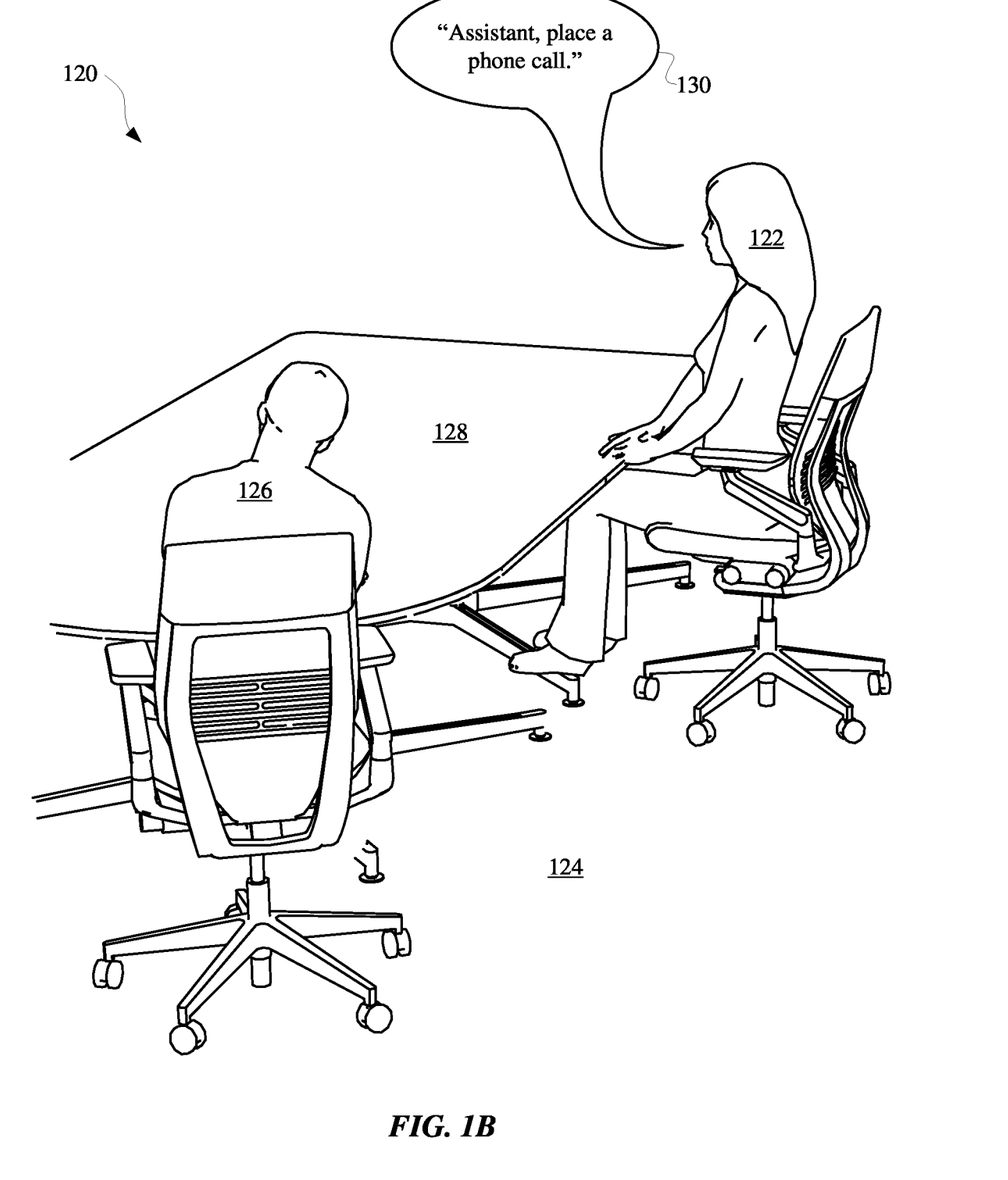

FIG. 1B illustrates a virtual environment 124 that the user 102 can be accessing or otherwise viewing from the perspective of an avatar 122 for the user 102. For example, the user 102 can be accessing the virtual environment 124 for a work meeting with another avatar 126, which can correspond to another user who is viewing the virtual environment 124 through another computing device. The virtual environment 124 can include virtual objects, such as a virtual conference table, and/or any other apparatus or computing device capable of being depicted in a virtual environment. When the user 102 provides the spoken utterance 114, an audio input interface of the computing device 104 can process input audio and cause rendering of the input audio within the virtual environment 124. As a result, the other user can hear the spoken utterance 114 (e.g., as a virtual spoken utterance 130) from the perspective of the other avatar 126.

In some implementations, the user 102 may be providing the spoken utterance 114 in furtherance of causing a virtual object to be rendered, by the automated assistant, with virtual features for further controlling the automated assistant. For example, in response to the spoken utterance 114, the automated assistant can identify one or more operations that can be initialized in furtherance of fulfilling a request embodied in the spoken utterance 114. The automated assistant can then identify virtual objects that may be associated with one or more of the identified operations, and/or one or more virtual features that can be attached to the virtual objects for controlling the operations. For example, the automated assistant can determine that the spoken utterance 114 includes a request to make a phone call and, in response, generate and/or select virtual object data that characterizes a graphical depiction of a telephone, such as the virtual telephone 142 illustrated in view 140 of FIG. 1C.

Figure 1C:
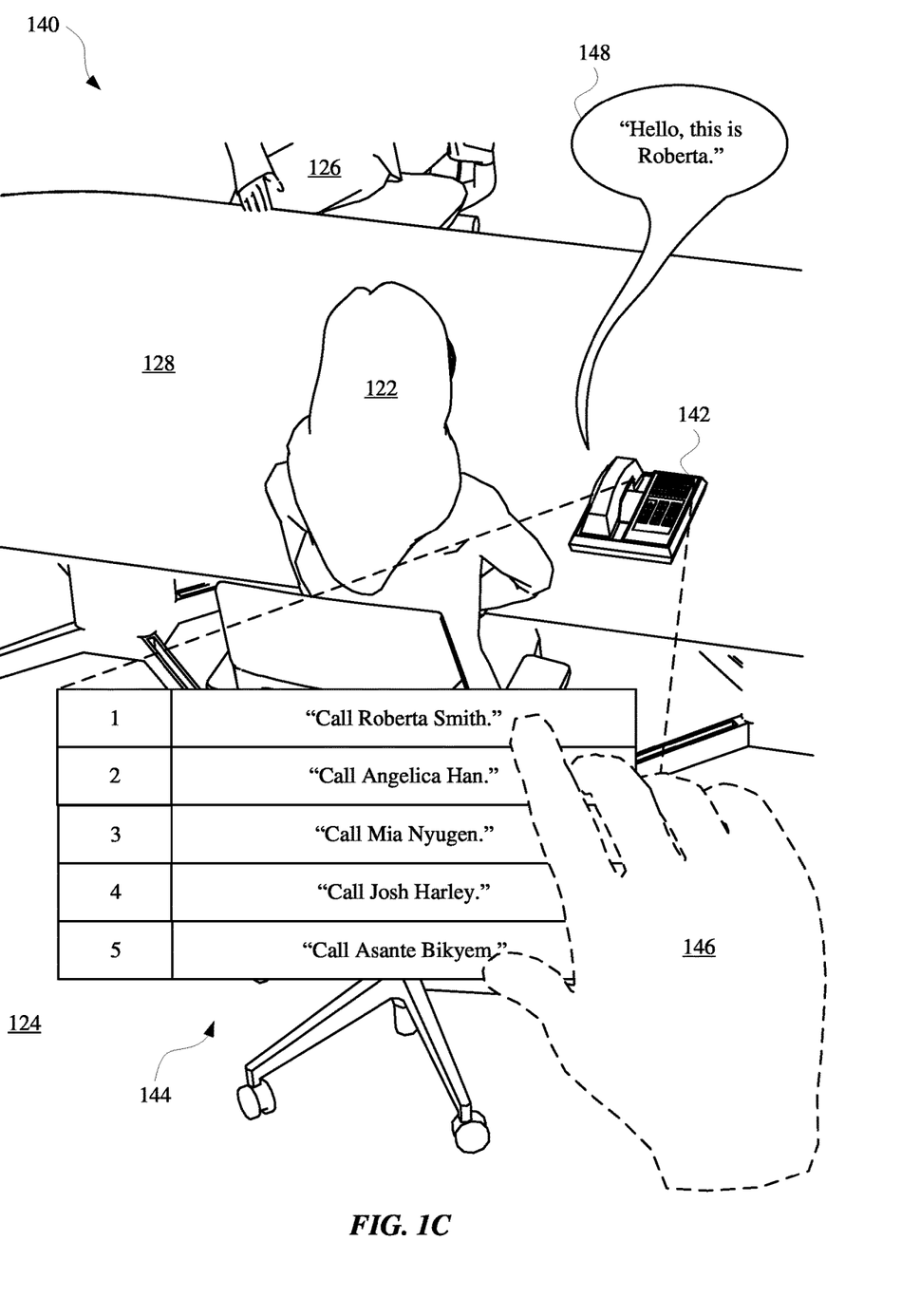

The virtual telephone 142 that is rendered in response to the spoken utterance 114 can operate as an interface between the user 102 and the automated assistant. The virtual telephone 142 can also be rendered in the virtual environment 124 such that the other user can view the virtual telephone 142 and, optionally, use the virtual telephone 142 with prior permission from the user 102. Accordingly, incorporating the virtual telephone 142 in the virtual environment 124 impacts not only what is visually and/or audibly rendered to the user 102 within the virtual environment and what the user 102 can interact with in the virtual environment—but can also impact what is visually and/or audibly rendered to other user(s) within the virtual environment and what the other user(s) can interact with in the virtual environment. For example, when a phone call is placed in the virtual environment 124 using the virtual telephone 142, any avatar that is within a threshold distance from virtual phone 142 could listen to the phone call and/or audibly participate in the phone call, with prior permission from the user 102 and/or any other party to the phone call. Alternatively, the user 102 can use their avatar 122 to pick up the headset of the virtual phone 142 and place the headset against an ear of the virtual avatar 122 to restrict the ability of any other users to participate in the phone call. In other words, the automated assistant can receive an input indicating that the user 102 picked up the headset via their avatar 122 and the automated assistant can cause the phone call to no longer be perceivable by any other user accessing the virtual environment 124.

In some implementations, features of the virtual phone 142 can be selected by the automated assistant according to, but not limited to, capabilities of the automated assistant in the physical environment. For example, the automated assistant can identify "warm" words that can be provided by the user 102 to control the automated assistant in certain contexts without providing an invocation phrase (e.g., "Assistant . . . ") first. Virtual features of virtual objects in the virtual environment 124 can be modified to indicate the warm words or otherwise indicate an input that can cause the same response in lieu of providing a corresponding warm word. For example, and as illustrated in FIG. 1C, the automated assistant can cause rendering of the virtual phone 142 with virtual features 144 that indicate warm words that can be provided by the user 102 to further control the automated assistant and/or one or more other applications.

The warm words can include, for example, "Call Roberta Smith," which can cause the automated assistant to initialize a phone call to a contact named "Roberta Smith" stored in a contacts list of the user 102. In some implementations, the operations initialized in response to the user 102 providing the warm word can also be initialized in response to the avatar 122 of the user 102 interacting with the virtual features 144. For example, the user 102 can cause a virtual hand 146 of the avatar 122 to tap a portion (e.g., a speed dial button) of the virtual features 144 having the warm word label "Call Roberta Smith" to cause the automated assistant to initialize the phone call to the contact Roberta Smith. Although the contact "Roberta Smith" may not be accessing the virtual environment 124, the contact can answer 148 the phone call (e.g., "Hello, this is Roberta.") and communicate with the user 102 and the other user (assuming the virtual phone 142 is in a virtual "speaker" mode).

Figure 1D:
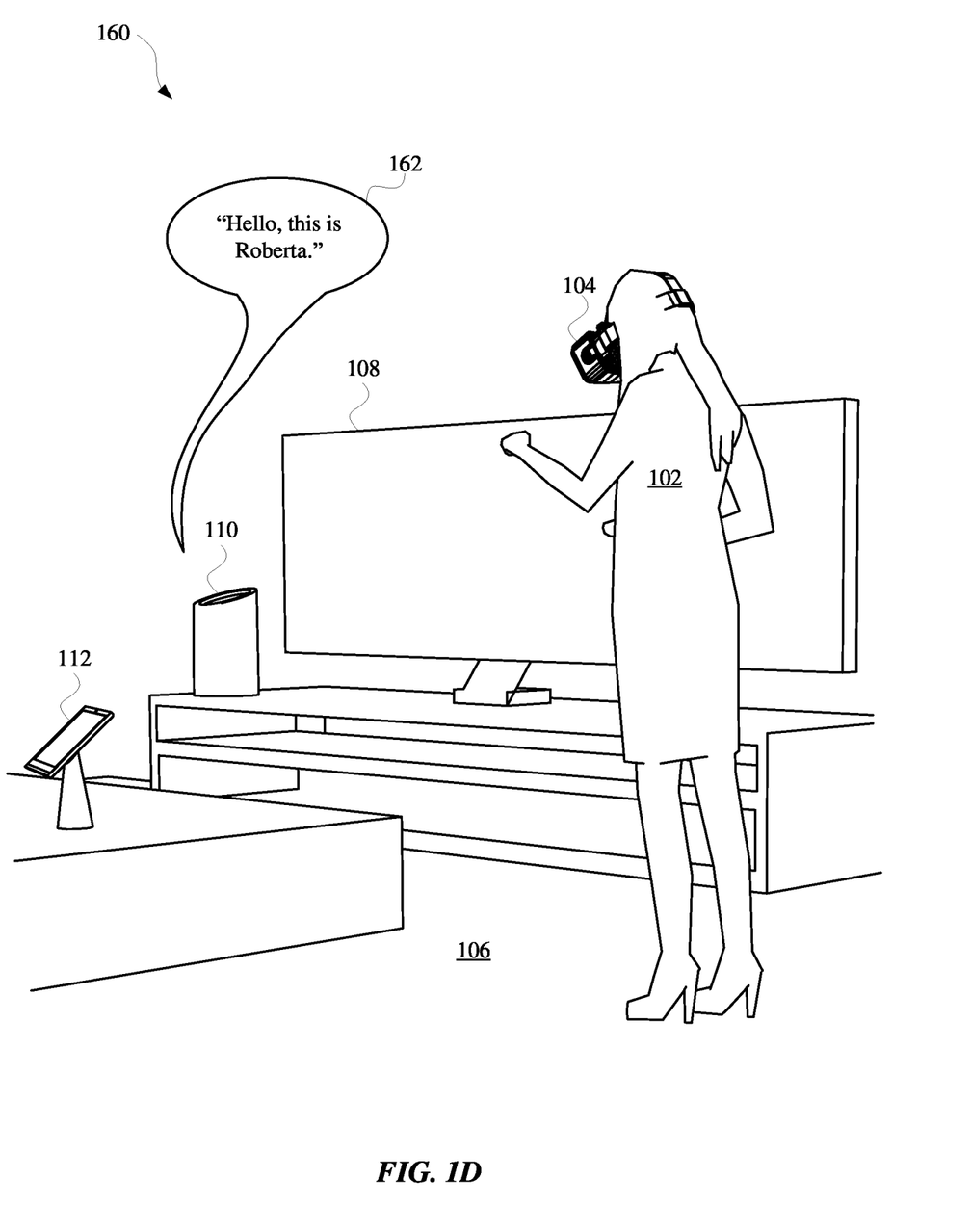

In some implementations, and as illustrated in FIG. 1D, the automated assistant can cause operations that have been initialized in the virtual environment 124 to affect devices in the physical environment 106 of the user 102. For example, when the user 102 has initialized the phone call via the automated assistant and the virtual phone 142, the automated assistant can cause an audio output (e.g., output 162) of a separate computing device (e.g., the standalone speaker device 110) to render the phone call audio of participants of the phone call. In some implementations, the decision of the automated assistant to utilize another device to render content from the virtual environment 124 can be based on a context of the user 102 and/or the automated assistant. For example, the automated assistant can determine that because the virtual phone 142 is located on a virtual object 128 such as a table, the audio from the phone call may be rendered more realistically if the audio was being rendered by a nearby speaker device that is located at a similar height and/or distance from the user 102 as the virtual phone 142 is relative to the avatar 122. Alternatively, or additionally, interfaces from multiple different devices (e.g., the standalone speaker device 110 and the display device 112) can be utilized to create different audio and/or visual effects for mimicking the virtual environment 124. For example, phone call audio from the standalone speaker device 110 can be greater than phone call audio emitted by the display device, thereby giving the user 102 the impression that the source of the phone call audio is more to their right of themselves, similar to how the virtual phone 142 is to the right of the avatar 122 in the virtual environment 124.

Figure 2:
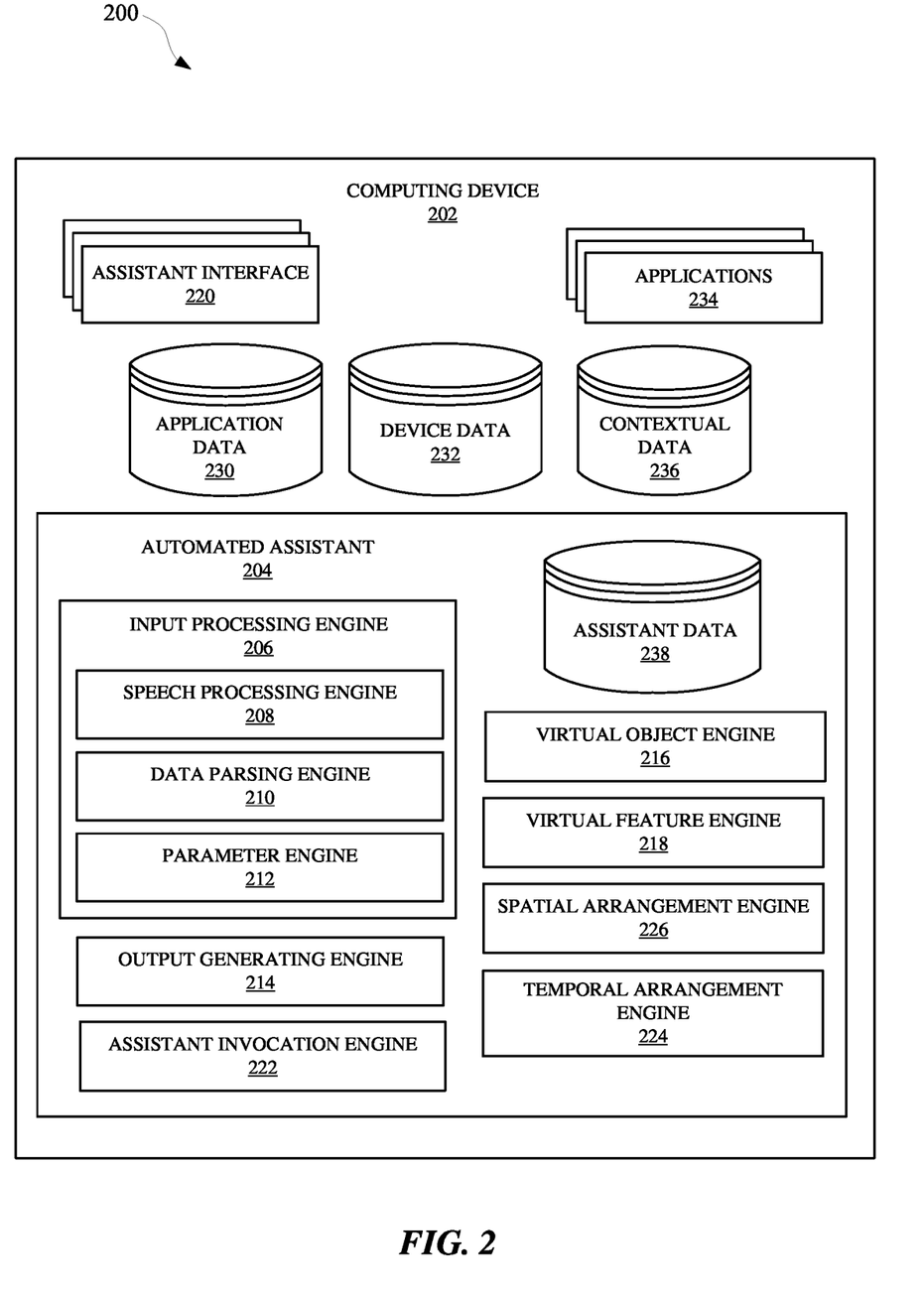
FIG. 2 illustrates a system with an automated assistant that can be accessible via a virtual environment for controlling features of the virtual environment and/or devices in a physical environment of the user.

FIG. 2 illustrates a system 200 with an automated assistant 204 that can be accessible via a virtual environment for controlling features of the virtual environment and/or devices in a physical environment of the user. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch display interface, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a virtual object engine 216 that can identify and/or generate virtual objects to render in a virtual environment according to how the user interacts with the automated assistant 204. The virtual environment can be provided by a separate entity than an entity that provides the automated assistant 204, and the automated assistant 204 can interface with the virtual environment using an API or other software interface. Virtual object data characterizing the virtual objects can be stored at the system 200 or another device, which the automated assistant 204 can access in response to receiving an input from a user. For example, in response to a spoken utterance from a user that is accessing a virtual environment, the virtual object engine 216 can identify and/or generate one or more virtual objects associated with a request embodied in the spoken utterance from the user. For example, data accessible to the virtual object engine 216 can provide a correlation between operations capable of being performed by the automated assistant 204 and virtual objects that can be rendered in the virtual environment. For instance, a request for the automated assistant 204 to render instructions for cooking a meal can result in the virtual object engine 216 selecting a virtual television object for rendering in the virtual environment for multiple users to view, or rendering kitchen-related objects (e.g., pots, pans, ingredients, an oven, etc.) for demonstrating how to cook the meal. The selection of these objects can be based on a determined correlation between the operations that can be performed to fulfill the request from the user and the virtual objects.

In some implementations, the system 200 can include a virtual feature engine 218 that can determine whether to include certain virtual features on the virtual objects, such that the virtual features can control operations of the automated assistant 204 and/or another application 234. For example, when the virtual object engine 216 selects certain objects to be rendered in the virtual environment, virtual object data characterizing the virtual objects can be provided to the virtual feature engine 218 for determining whether to include certain virtual features on the virtual objects. The virtual feature engine 218 can select the virtual features based on a context of the user, an input from the user, capabilities of the automated assistant, historical interaction data associated with the user and/or one or more other users, the selected virtual objects, and/or any other information that can be available to the automated assistant 204, with prior permission from the user(s). For example, when the user provides the request to see how a particular meal is cooked, a virtual object that is selected for rendering can include an oven. The virtual feature engine 218 can then determine that certain operations that a user may ask the automated assistant to perform when viewing a recipe can include setting a timer. Therefore, the virtual feature engine 218 can cause a "timer" feature (e.g., a virtual dial) and/or text for requesting a timer (e.g., "Set a time.") to be included on the virtual oven object (e.g., on a front interface of the virtual oven).

In some implementations, the system 200 can include a spatial arrangement engine 226 that can determine a spatial arrangement of virtual objects that the user can interact with for controlling and/or invoking the automated assistant 204. The spatial arrangement engine 226 can also generate or otherwise access data that can be utilized to determine how to convey certain information requested by the user from the automated assistant 204. For example, when a user is accessing a virtual environment and provides a request for certain information, such as how to cook a particular recipe, the automated assistant 204 can access information on the internet, such as images, videos, web applications, and/or other web data. This information can be accessed in furtherance of the automated assistant 204 determining how to fulfill the request for information from the user, with prior permission from any authors and/or owners of the accessed information. For example, a video that the automated assistant 204 might otherwise render for the user in a physical environment (e.g., a recipe video rendered at their physical kitchen smart display) can be processed to identify objects within the video that can be rendered in the virtual environment for the user and/or other users to view. Virtual object data can then be generated by the virtual object engine 216 and communicated to the spatial arrangement engine 226 for determining how to arrange the virtual objects in the virtual environment to convey the information as the video conveyed the information.

In some implementations, the selection and/or arrangement of the virtual objects can be selected according to characteristics of the virtual environment, such as whether an avatar for the user is located in a small room or a large room, in a room that already includes comparable objects, in a room that other users are located in, and/or otherwise determine any other characteristics that can influence decisions for arranging objects in a room. For example, the user can be in a virtual environment that is intended to resemble an outdoor campground, and therefore the virtual oven that is selected for demonstrating a recipe can include a virtual propane camping oven instead of a large kitchen appliance. Alternatively, when the user is in a virtual environment such as a virtual shopping mall with other users, the virtual object that is selected can be a handheld table computing device, instead of a large television or kitchen objects, thereby allowing the user to view the recipe privately in a virtual space that may have many other users.

In some implementations, the information that is accessed in response to the request from the user can also be accessed by a temporal arrangement engine 224, which can determine how certain virtual objects should be spatially arranged over time to convey the information that the user is requesting. For example, data from one or more internet videos can be accessed, with prior permission from authors and/or owners of the videos, to determine how certain objects in the videos are utilized over time to convey certain information. For instance, when the user has requested a demonstration of a cooking recipe, information regarding how certain kitchen tools are utilized to prepare certain vegetables can be determined. This information can then be processed by the temporal arrangement engine 224 to generate virtual object data that can characterize how virtual kitchen tools (e.g., a cheese grater) should be maneuvered (e.g., speed, angle, grip, etc.) over time with respect to another virtual object (e.g., a block of cheese) to convey instructions for the recipe. In some implementations, requests for such virtual demonstrations can be fulfilled by also providing a virtual controller for the user to control playback of the information, such as by controlling the speed of video playback at the display interface in which the user is viewing the virtual environment, a volume level of audio being rendered during the video playback, and/or any other parameter of an operation of the automated assistant 204 and/or another application 234.

In some implementations, the spatial arrangement engine 226 and/or the temporal arrangement engine 224 can generate training data for further training various machine learning models in furtherance of providing more accurate information to users. In some implementations, the training data can be generated based on how users convey certain information to other users in the virtual environment using virtual objects, with prior permission from the users. For example, an API can be utilized by the automated assistant 204 to retrieve data from the virtual environment, and the data can characterize how certain virtual objects have been maneuvered by users in the virtual environment to convey certain information and/or otherwise perform certain tasks. Alternatively, or additionally, models can be trained using supervised or unsupervised learning, which can iteratively refine playback of certain information learned from sources on the internet to reduce inaccuracies in playback of the certain information over time.

Figure 3:
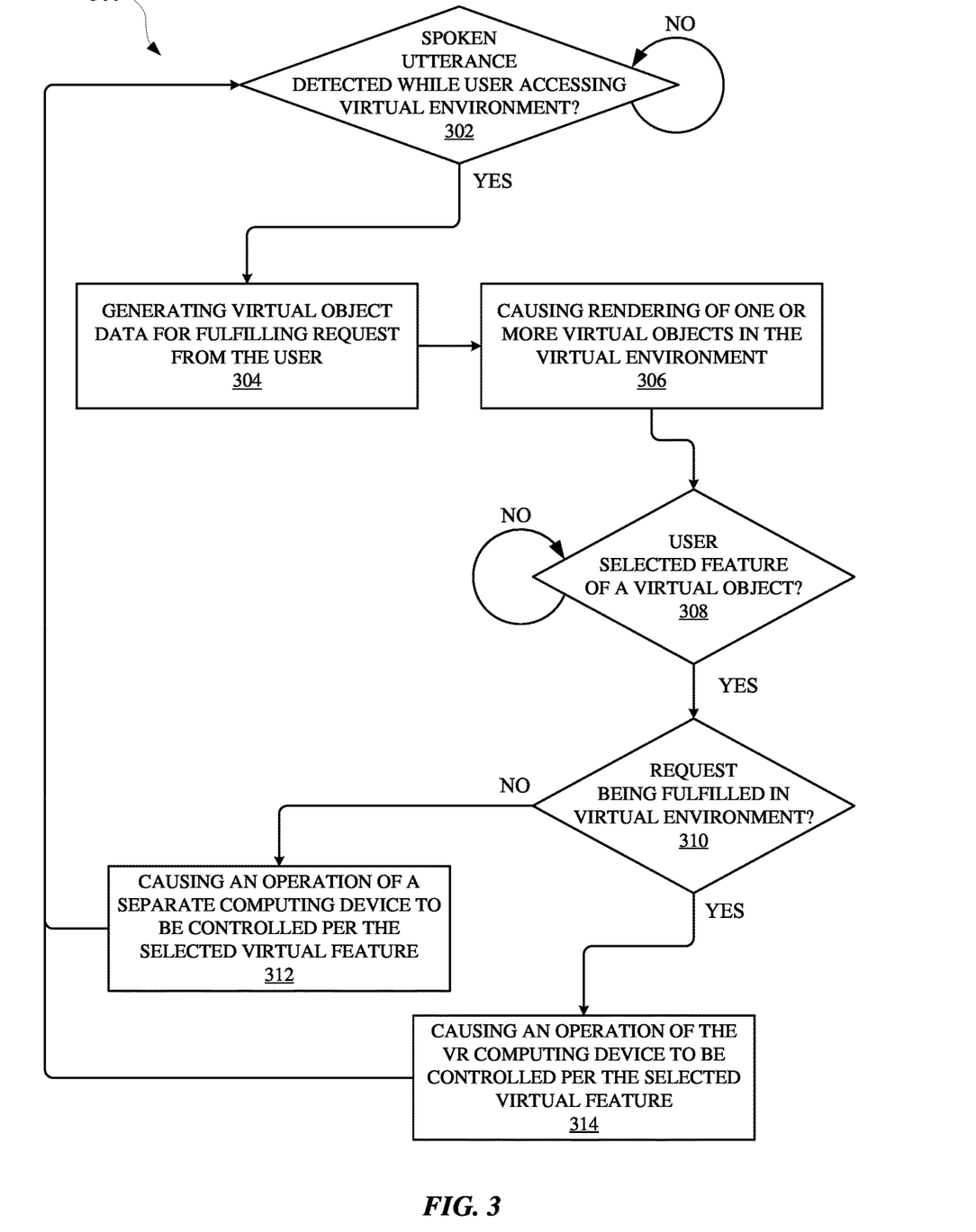
FIG. 3 illustrates a method for facilitating automated assistant responses in a virtual environment using virtual objects that can be utilized to further control assistant operations.

FIG. 3 illustrates a method 300 for facilitating automated assistant responses in a virtual environment using virtual objects that can be utilized to further control assistant operations. The assistant operations and/or other application operations can be controlled using a virtual object, and optionally, can affect an experience of one or more other users in the virtual environment. The method 300 can be performed by one or more computing devices, applications, and/or any other apparatus or module that can be associated with an automated assistant. In some implementations, the method 300 can include an operation 302 of determining whether the spoken utterance was detected while a user is accessing a virtual environment. The user can access a virtual environment through the computing device, which can be a virtual reality headset, computerized glasses, and/or any other apparatus that can provide access to a virtual reality environment and/or an augmented reality experience. In some implementations, the computing device can include a display interface for viewing the virtual environment and an audio interface for listening to audio that is virtually rendered in the virtual environment. A spoken utterance from the user who is accessing the virtual environment can be captured as input audio by the computing device, or by a separate computing device in a physical environment with the user. For example, the user can be wearing a virtual reality headset with a display interface and an audio output interface, while sitting on their couch in a living room in which another assistant-enabled device is located. Therefore, when the user provides the spoken utterance, the other assistant-enabled device can be responsive to the spoken utterance, and/or the computing device rendering the virtual environment can be responsive to the spoken utterance.

When a spoken utterance is detected while the user is accessing the virtual environment, the method 300 can proceed from the operation 302 to an operation 304. The operation 304 can include generating virtual object data for fulfilling the request from the user. The request can be embodied in the spoken utterance, which can be processed as audio input data at the computing device or another computing device that facilitates automated assistant interactions. The virtual object data that is generated can be based on one or more operations that can be initialized for fulfilling the request from the user. For example, when a user has requested a television show to be rendered, virtual objects that can be selected to fulfill this request can include a virtual television object, a virtual television remote control object, and/or any other object that can be associated with rendering video playback. In some implementations, the virtual object data can be selected from an existing database, which can provide correlations between certain assistant operations and certain virtual objects. In some implementations, the virtual objects can be selected based on characteristics of the virtual environment that the user is viewing or otherwise interacting with. For example, when the user is in a virtual home office, a virtual tablet computing device can be selected as a virtual object to use for fulfilling the request from the user. However, when the user is viewing a virtual living room space, a virtual television object can be selected because of the space available for displaying the virtual television object on a virtual wall of the living room space. Alternatively, or additionally, when the user is accessing an augmented virtual reality environment (e.g., via computerized glasses), and the user is sitting in their physical living room with an assistant-enabled television, the virtual object that is selected may be limited to a virtual television remote control with virtual features such as buttons and dials for controlling the physical television in the physical living room.

The method 300 can proceed from the operation 304 to an operation 306, which can include causing rendering of one or more virtual objects in the virtual environment. The one or more virtual objects can include, for example, a visual three-dimensional depiction of a hardware device, such as an audio playback device, a video playback device, a robotic device, and/or any other object that can be rendered in a virtual environment. Alternatively, or additionally, the one or more virtual objects can include a visual three-dimensional depiction of a controller that can control another object in the virtual environment and/or a physical object in a physical environment. For example, the virtual object can include a remote control with virtual features such as buttons and/or other virtual features that resemble touch interfaces of an object in the physical world. The method 300 can proceed from the operation 306 to an operation 308.

The operation 308 can include determining whether the user selected a feature of a virtual object in furtherance of controlling an operation of the automated assistant and/or an operation of one or more other applications. For example, the automated assistant causes rendering of a virtual television remote control and/or a virtual record player with buttons, and the automated assistant can determine whether the user selected a button of the virtual remote control or the virtual record player. When the user has provided a selection of a particular feature (e.g., by performing a gesture, such as pointing their physical finger, as an input to a camera of the computing device), the method 300 can proceed from the operation 308 to an operation 310. Otherwise, the method 300 can continue to determine whether the user has interacted with any feature of any rendered virtual object and/or whether the user is still viewing the virtual environment.

When the user is determined to have selected a virtual feature of a virtual object in the virtual environment, the method 300 can proceed from the operation 308 to an operation 310. The operation 310 can include determining whether the request from the user is being fulfilled exclusively in the virtual environment or in the physical environment. When the request is being fulfilled in the virtual environment, the method 300 can proceed from the operation 310 to an operation 314. The operation 314 can include causing an operation of the computing device (e.g., the computing device that the user is accessing to view the virtual environment) to be controlled per the selected virtual feature. For example, when fulfilling the request includes rendering audio playback in the virtual environment, and the virtual feature includes a "skip" button on a virtual record player, the selection of the virtual feature can cause a track of the audio playback to be skipped.

When the request is being fulfilled in the physical environment of the user (e.g., on a speaker device in the physical home of the user), the method 300 can proceed from the operation 310 to an operation 312. The operation 312 can include causing an operation of a separate computing device (e.g., the speaker device in the physical home of the user) to be controlled per the selected virtual feature. For example, when fulfilling the request submitted in the virtual environment includes rendering audio playback, and the selected virtual feature is a virtual volume button on a virtual remote control or the virtual record player, volume of the audio playback can be adjusted according to selection of the virtual button (e.g., increasing or decreasing the volume of the speaker in the home of the user). In this way, the automated assistant can be responsive to inputs from a user that is viewing a virtual environment, such as virtual reality or augmented reality. Additionally, this can allow the user to further interact with their automated assistant through various types of objects in the virtual environment, which can be adapted according to a context of the user within the virtual environment and/or within a physical environment of the user.

Figure 4:
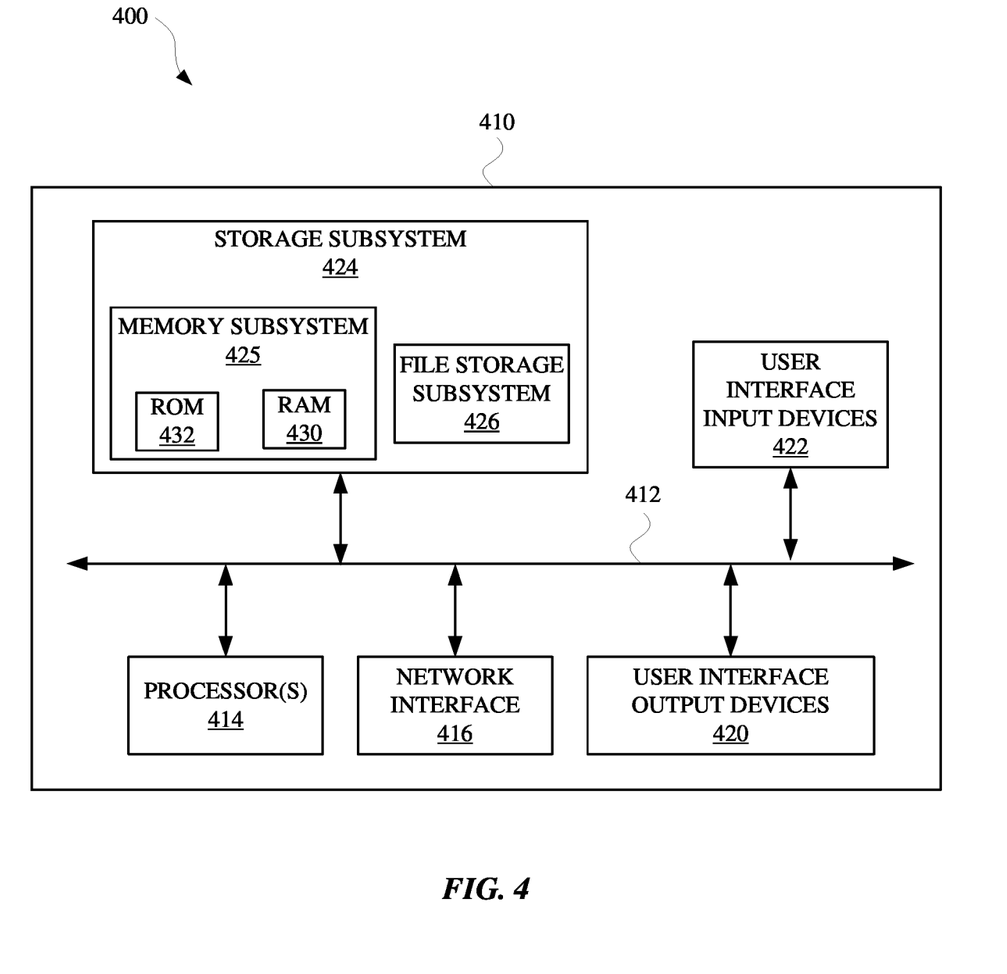
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, automated assistant, and/or any other application, device, apparatus, and/or module discussed herein.

These software modules are generally executed by processor 414 alone or in combination with other processors.

Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a user has provided a spoken utterance while the user is viewing a virtual environment via a display interface of a computing device. The spoken utterance is directed to an automated assistant application that is accessible via the computing device. The method can further include determining, based on the spoken utterance, a request that the user is soliciting the automated assistant application to fulfill in response to receiving the spoken utterance. The request is capable of being fulfilled by the automated assistant application via a separate device and without interaction with the virtual environment. The method can further include causing, based on the request that the user is soliciting the automated assistant application to fulfill, the automated assistant application to generate virtual object data that characterizes a virtual object to be rendered in the virtual environment. The virtual object, when rendered in the virtual environment, includes a virtual feature for the user to interact with, in the virtual environment, for controlling an operation of the automated assistant application and/or of another application. The method can further include causing, in response to the spoken utterance, the automated assistant application to render the virtual object with the virtual feature in the virtual environment and initialize the operation in furtherance of fulfilling the request from the user.

Those and other implementations of the technology can include one or more of the following features.

In some implementations, the computing device is a virtual reality headset or computerized glasses being worn by the user, and the separate computing device includes a touch display for interacting with the automated assistant. In some implementations, the computing device and the separate computing device communicate via a wireless network. In some of those implementations, the method further include: determining, by the automated assistant application and in response to the spoken utterance, to cause the automated assistant application to render a response for the user via the computing device. The computing device is selected for responding to the user, over the separate computing device, based on the user accessing the virtual environment while providing the spoken utterance. In some implementations, the method can further include: determining that the user has provided an input to the computing device in furtherance of selecting the virtual feature of the virtual object, where a selection of the virtual feature specifies a parameter for the operation; and causing, in response to the user providing the input, the operation to be modified according to the parameter selected by the user via the virtual feature of the virtual object.

In some implementations, the request includes causing audio to be rendered via the computing device, and the virtual object is a virtual rendering of an audio device and the virtual feature includes a virtual hardware interface for controlling playback of the audio via the computing device. In some implementations, the request includes causing audio to be rendered via the separate computing device, the virtual object is a virtual rendering of an audio device, and the virtual feature includes a virtual hardware interface for controlling playback of the audio via the separate computing device. In some implementations, the virtual rendering of the audio device includes a graphical rendering of the separate computing device. In some implementations, the user provides the spoken utterance simultaneously to one or more other users viewing the virtual environment via one or more other computing devices. In some implementations, fulfilling the request includes causing the rendering of audio via the computing device and the one or more other computing devices for the one or more other users, and the virtual object is a virtual rendering of an audio device and the virtual feature includes a virtual hardware interface for controlling playback of the rendering of the audio via the computing device and the one or more other computing devices.

In some implementations, a method implemented by one or more processors is set forth as including operations such as determining that a user has provided a spoken utterance while the user is viewing a virtual environment via a display interface of a computing device. The spoken utterance is directed to an automated assistant application that is accessible via the computing device. The method can further include determining, based on the spoken utterance, a request that the user is soliciting the automated assistant application to fulfill by controlling a separate computing device. The method can further include causing, based on the request that the user is soliciting the automated assistant application to fulfill, the automated assistant application to generate virtual object data that characterizes a virtual object to be rendered in the virtual environment. The virtual object, when rendered in the virtual environment, includes a virtual feature for the user to interact with, in the virtual environment, for controlling an operation of the separate computing device. The method can further include causing, in response to the spoken utterance, the automated assistant application to cause rendering of the virtual object with the virtual feature in the virtual environment and initialize the operation at the separate computing device in furtherance of fulfilling the request from the user.

Those and other implementations of the technology can include one or more of the following features.

In some implementations, the computing device is a virtual reality headset or computerized glasses being worn by the user, and the separate computing device includes a display interface. In some implementations, the method can further include determining, by the automated assistant application and in response to the spoken utterance, to cause the automated assistant application to render a response for the user via the computing device. In some of those implementations, the computing device is selected for responding to the user, over the separate computing device, based on the user accessing the virtual environment while providing the spoken utterance. The method can further include determining that the user has provided an input to the computing device in furtherance of selecting the virtual feature of the virtual object, where a selection of the virtual feature specifies a parameter for the operation; and causing, in response to the user providing the input, the operation to be modified according to the parameter selected by the user via the virtual feature of the virtual object. In some implementations, the request includes causing audio to be rendered via the separate computing device, and the virtual feature includes a virtual hardware interface for controlling playback of the audio via the separate computing device. In some implementations, the separate computing device includes a separate display interface for rendering video data, and the virtual hardware interface includes a virtual remote control that is rendered as an augmented reality object for controlling playback of the video data.

In some implementations, a method implemented by one or more processors is set forth as including operations such as receiving, by an automated assistant application, a request from a user while the user is viewing a virtual environment via a display interface of a computing device. The method can further include determining, based on the request, video data that conveys information that fulfills the request, wherein the request is capable of being fulfilled by the automated assistant application by rendering the video data via a separate computing device without utilizing the virtual environment. The method can further include determining, based on the video data, a spatial arrangement of virtual objects that can change over time in the virtual environment to convey the information that fulfills the request. The method can further include causing, in response to receiving the request from the user, the virtual objects to be rendered in the virtual environment such that the spatial arrangement of the virtual objects in the virtual environment changes over time to convey the information.

Those and other implementations of the technology can include one or more of the following features.

In some implementations, the request is received from the user simultaneous to one or more other users viewing the virtual environment via other computing devices, and causing the virtual objects to be rendered in the virtual environment includes causing the virtual objects to be viewable by the one or more other users in the virtual environment. In some implementations, the method can further include causing, in response to receiving the request from the user, a virtual controller to be rendered in the virtual environment, where the virtual controller includes a virtual hardware interface for controlling changes to the spatial arrangement of the virtual objects over time. The method further include determining that the user has provided an input to the computing device in furtherance of selecting the virtual hardware interface of the virtual controller, where a selection of the virtual hardware interface specifies a parameter for an operation of changing the spatial arrangement of the virtual objects over time; and causing, in response to the user providing the input, the operation to be modified according to the parameter selected by the user via the virtual interface of the virtual controller. In some implementations, the parameter includes an audio volume for audio, or a playback speed for video, rendered when the spatial arrangement of the virtual objects is changing over time.

We claim:
1. A method implemented by one or more processors, the method comprising:
    determining that a user has provided a spoken utterance while the user is viewing a virtual environment via a display interface of a computing device,
        wherein the spoken utterance is directed to an automated assistant application that is accessible via the computing device;
    determining, based on the spoken utterance, a request that the user is soliciting the automated assistant application to fulfill in response to receiving the spoken utterance,
        wherein the request is capable of being fulfilled by the automated assistant application via a separate computing device and without interaction with the virtual environment;
    causing, based on the request that the user is soliciting the automated assistant application to fulfill, the automated assistant application to generate virtual object data that characterizes a virtual object to be rendered in the virtual environment,
wherein the virtual object, when rendered, includes a virtual feature for the user to interact with, in the virtual environment, for controlling an operation of the automated assistant application and/or of another application;
causing, in response to the spoken utterance, the automated assistant application to render the virtual object with the virtual feature in the virtual environment and initialize the operation in furtherance of fulfilling the request from the user;
determining that the user has provided an input to the computing device in furtherance of selecting the virtual feature of the virtual object,
wherein a selection of the virtual feature specifies a parameter for the operation; and
causing, in response to the user providing the input, the operation to be modified according to the parameter selected by the user via the virtual feature of the virtual object.

2. The method of claim 1, wherein the computing device is a virtual reality headset or computerized glasses being worn by the user, and the separate computing device includes a touch display for interacting with the automated assistant application.

3. The method of claim 2, wherein the computing device and the separate computing device communicate via a wireless network, and the method further comprises:
determining, by the automated assistant application and in response to the spoken utterance, to cause the automated assistant application to render a response for the user via the computing device,
wherein the computing device is selected for responding to the user, over the separate computing device, based on the user accessing the virtual environment while providing the spoken utterance.

4. The method of claim 1,
wherein the request includes causing audio to be rendered via the computing device, and
wherein the virtual object is a virtual rendering of an audio device and the virtual feature includes a virtual hardware interface for controlling playback of the audio via the computing device.

5. The method of claim 4,
wherein the request includes causing audio to be rendered via the separate computing device, and
wherein the virtual object is the virtual rendering of the audio device and the virtual feature includes the virtual hardware interface for controlling playback of the audio via the separate computing device.

6. The method of claim 5, wherein the virtual rendering of the audio device includes a graphical rendering of the separate computing device.

7. The method of claim 1, wherein the user provides the spoken utterance simultaneously to one or more other users viewing the virtual environment via one or more other computing devices.

8. The method of claim 7,
wherein fulfilling the request includes causing a rendering of audio via the computing device and the one or more other computing devices for the one or more other users, and
wherein the virtual object is a virtual rendering of an audio device and the virtual feature includes a virtual hardware interface for controlling playback of the rendering of the audio via the computing device and the one or more other computing devices.

9. A method implemented by one or more processors, the method comprising:
determining that a user has provided a spoken utterance while the user is viewing a virtual environment via a display interface of a computing device,
wherein the spoken utterance is directed to an automated assistant application that is accessible via the computing device;
determining, based on the spoken utterance, a request that the user is soliciting the automated assistant application to fulfill by controlling a separate computing device;
causing, based on the request that the user is soliciting the automated assistant application to fulfill, the automated assistant application to generate virtual object data that characterizes a virtual object to be rendered in the virtual environment,
wherein the virtual object, when rendered, includes a virtual feature for the user to interact with, in the virtual environment, for controlling an operation of the separate computing device;
causing, in response to the spoken utterance, the automated assistant application to cause rendering of the virtual object with the virtual feature in the virtual environment and initialize the operation at the separate computing device in furtherance of fulfilling the request from the user;
determining that the user has provided an input to the computing device in furtherance of selecting the virtual feature of the virtual object,
wherein a selection of the virtual feature specifies a parameter for the operation; and
causing, in response to the user providing the input, the operation to be modified according to the parameter selected by the user via the virtual feature of the virtual object.

10. The method of claim 9, wherein the computing device is a virtual reality headset or computerized glasses being worn by the user, and the separate computing device includes a display interface.

11. The method of claim 9, further comprising:
determining, by the automated assistant application and in response to the spoken utterance, to cause the automated assistant application to render a response for the user via the computing device,
wherein the computing device is selected for responding to the user, over the separate computing device, based on the user accessing the virtual environment while providing the spoken utterance.

12. The method of claim 9,
wherein the request includes causing audio to be rendered via the separate computing device, and
wherein the virtual feature includes a virtual hardware interface for controlling playback of the audio via the separate computing device.

13. The method of claim 12, wherein the separate computing device includes a separate display interface for rendering video data, and the virtual hardware interface includes a virtual remote control that is rendered as an augmented reality object for controlling playback of the video data.

14. A method implemented by one or more processors, the method comprising:
receiving, by an automated assistant application, a request from a user while the user is viewing a virtual environment via a display interface of a computing device;

determining, based on the request, video data that conveys information that fulfills the request,
  wherein the request is capable of being fulfilled by the automated assistant application by rendering the video data via a separate computing device without utilizing the virtual environment;
determining, based on the video data, a spatial arrangement of virtual objects that can change over time in the virtual environment to convey the information that fulfills the request; and
causing, in response to receiving the request from the user, the virtual objects to be rendered in the virtual environment such that the spatial arrangement of the virtual objects in the virtual environment changes over time to convey the information.

15. The method of claim 14,
wherein the request is received from the user simultaneous to one or more other users viewing the virtual environment via other computing devices, and
wherein causing the virtual objects to be rendered in the virtual environment includes causing the virtual objects to be viewable by the one or more other users in the virtual environment.

16. The method of claim 14, further comprising:
causing, in response to receiving the request from the user, a virtual controller to be rendered in the virtual environment,
wherein the virtual controller includes a virtual hardware interface for controlling changes to the spatial arrangement of the virtual objects over time.

17. The method of claim 16, further comprising:
determining that the user has provided an input to the computing device in furtherance of selecting the virtual hardware interface of the virtual controller,
  wherein a selection of the virtual hardware interface specifies a parameter for an operation of changing the spatial arrangement of the virtual objects over time; and
causing, in response to the user providing the input, the operation to be modified according to the parameter selected by the user via the virtual hardware interface of the virtual controller.

18. The method of claim 17, wherein the parameter includes an audio volume for audio, or a playback speed for video, rendered when the spatial arrangement of the virtual objects is changing over time.

19. A method implemented by one or more processors, the method comprising:
determining that a user has provided a spoken utterance while the user is viewing a virtual environment via a display interface of a computing device,
  wherein the spoken utterance is directed to an automated assistant application that is accessible via the computing device;
determining, based on the spoken utterance, a request that the user is soliciting the automated assistant application to fulfill in response to receiving the spoken utterance,
  wherein the request is capable of being fulfilled by the automated assistant application via a separate computing device and without interaction with the virtual environment;
causing, based on the request that the user is soliciting the automated assistant application to fulfill, the automated assistant application to generate virtual object data that characterizes a virtual object to be rendered in the virtual environment,
  wherein the virtual object, when rendered, includes a virtual feature for the user to interact with, in the virtual environment, for controlling an operation of the automated assistant application and/or of another application; and
causing, in response to the spoken utterance, the automated assistant application to render the virtual object with the virtual feature in the virtual environment and initialize the operation in furtherance of fulfilling the request from the user;
  wherein the user provides the spoken utterance simultaneously to one or more other users viewing the virtual environment via one or more other computing devices;
  wherein fulfilling the request includes causing a rendering of audio via the computing device and the one or more other computing devices for the one or more other users, and
  wherein the virtual object is a virtual rendering of an audio device and the virtual feature includes a virtual hardware interface for controlling playback of the rendering of the audio via the computing device and the one or more other computing devices.

* * * * *